(12) United States Patent
Chung et al.

(10) Patent No.: US 10,502,971 B1
(45) Date of Patent: Dec. 10, 2019

(54) IMAGE CAPTURING MODULE

(71) Applicant: Gingy Technology Inc., Hsinchu (TW)

(72) Inventors: Chuck Chung, Hsinchu (TW); Jen-Chieh Wu, Hsinchu (TW)

(73) Assignee: Gingy Technology Inc., Hsinchu (TW)

( * ) Notice: Subject to any disclaimer, the term of this patent is extended or adjusted under 35 U.S.C. 154(b) by 0 days.

(21) Appl. No.: 16/372,440

(22) Filed: Apr. 2, 2019

Related U.S. Application Data

(60) Provisional application No. 62/693,459, filed on Jul. 3, 2018.

(51) Int. Cl.
*G02B 27/30* (2006.01)
*G02B 5/00* (2006.01)
*H04N 5/225* (2006.01)

(52) U.S. Cl.
CPC .......... *G02B 27/30* (2013.01); *G02B 5/003* (2013.01); *H04N 5/2253* (2013.01); *H04N 5/2254* (2013.01)

(58) Field of Classification Search
CPC ...... G02B 27/30; G02B 5/003; H04N 5/2253; H04N 5/2254
See application file for complete search history.

(56) References Cited

U.S. PATENT DOCUMENTS

| | | | | |
|---|---|---|---|---|
| 7,835,079 B2 * | 11/2010 | El-Ghoroury | ........ | G03B 21/625 353/30 |
| 8,116,606 B2 | 2/2012 | Sugawara et al. | | |
| 9,090,315 B1 * | 7/2015 | Stone | ................... | G02B 6/3604 |
| 9,392,129 B2 * | 7/2016 | Simmons | ............. | G02B 27/225 |
| 9,811,711 B2 | 11/2017 | Huang et al. | | |
| 9,900,485 B2 * | 2/2018 | Fujita | ................... | H04N 5/2256 |
| 2014/0035959 A1 * | 2/2014 | Lapstun | ................. | G02B 26/10 345/690 |
| 2014/0186038 A1 * | 7/2014 | Frisken | ................... | G02B 6/356 398/50 |
| 2016/0085143 A1 * | 3/2016 | Hu | ..................... | G03B 21/2013 362/553 |
| 2017/0011248 A1 | 1/2017 | Wu | | |
| 2017/0351898 A1 | 12/2017 | Zhang | | |
| 2018/0025205 A1 | 1/2018 | Wu et al. | | |
| 2018/0040675 A1 | 2/2018 | Zeng et al. | | |
| 2018/0266641 A1 * | 9/2018 | Albou | ...................... | H01S 5/005 |
| 2018/0359384 A1 * | 12/2018 | Nishida | ................... | H04N 1/04 |
| 2019/0021602 A1 * | 1/2019 | Hurley | ................ | A61B 5/0062 |

FOREIGN PATENT DOCUMENTS

| | | |
|---|---|---|
| JP | H11120324 | 4/1999 |
| TW | 483204 | 4/2002 |
| TW | 201333571 | 8/2013 |

* cited by examiner

*Primary Examiner* — Chiawei Chen
(74) *Attorney, Agent, or Firm* — JCIPRNET

(57) ABSTRACT

An image capturing module includes a cover plate, a sensor, and a light collimator. The light collimator is disposed between the cover plate and the sensor. The light collimator includes a plurality of light collimating units. Each of the light collimating units includes at least one fiber and a plurality of light absorbing columns. The light absorbing columns are disposed parallel to the at least one fiber and surround the at least one fiber. A thickness of the light collimator is T. A distance between two light absorbing columns farthest from each other among the light absorbing columns in each of the light collimating units is D. A numerical aperture of the at least one fiber is NA, NA≤0.7, and D≤T×tan[$\sin^{-1}$(NA)].

20 Claims, 12 Drawing Sheets

IMAGE CAPTURING MODULE

CROSS-REFERENCE TO RELATED APPLICATION

This application claims the priority benefit of U.S. provisional application Ser. No. 62/693,459, filed on Jul. 3, 2018. The entirety of the above-mentioned patent application is hereby incorporated by reference herein and made a part of this specification.

BACKGROUND

Technical Field

The invention relates to an optoelectric module. More particularly, the invention relates to an image capturing module.

Description of Related Art

Types of biometric identification include face, voice, iris, retina, vein, palm print, and fingerprint identifications. The biometric feature identification apparatuses may be categorized into the optical, capacitive, ultrasonic, and thermal induction identification apparatuses according to different sensing methods. Generally, an optical biometric feature identification apparatus includes a light source, a light guide device, and a sensor. The light beam emitted by the light source irradiates the object pressing on the light guide device. The sensor receives the light beam reflected by the object to identify biometric features. In the process of capturing an image by the sensor, the light beam reflected by the fingerprints may easily be transmitted to the sensor in a scattering manner, which may lead to poor image capturing quality and affect the identification result. Although several techniques are developed to improve the quality of image capturing, the crosstalk problem still can not be effectively improved by the exiting techniques.

SUMMARY

The invention provides an image capturing module featuring a favorable identification capability.

An image capturing module in an exemplary embodiment of the invention includes a cover plate, a sensor, and a light collimator. The light collimator is disposed between the cover plate and the sensor. The light collimator includes a plurality of light collimating units. Each of the light collimating units includes at least one fiber and a plurality of light absorbing columns. The light absorbing columns are disposed parallel to the at least one fiber and surround the at least one fiber. A thickness of the light collimator is T. A distance between two light absorbing columns farthest from each other among the light absorbing columns in each of the light collimating units is D. A numerical aperture of the at least one fiber is NA, NA≤0.7, and D Txtan[$\sin^{-1}$(NA)].

In an exemplary embodiment of the invention, any two adjacent light collimating units share at least one light absorbing column.

In an exemplary embodiment of the invention, any two adjacent light collimating units do not share any light absorbing column.

In an exemplary embodiment of the invention, a clad of the at least one fiber includes a plurality of light absorption particles.

In an exemplary embodiment of the invention, each of the light absorbing columns is a solid light absorbing column body.

In an exemplary embodiment of the invention, each of the light absorbing columns includes a light absorbing core and a clad encapsulating the light absorbing core. The clad includes a plurality of light absorption particles.

In an exemplary embodiment of the invention, extending directions of the at least one fiber and the light absorbing columns are perpendicular to or inclined with respect to the cover plate.

In an exemplary embodiment of the invention, the image capturing module further includes a light source. The light source is disposed next to the sensor.

In an exemplary embodiment of the invention, the image capturing module further includes a band pass filter. The band pass filter is disposed between the light collimator and the sensor.

In an exemplary embodiment of the invention, the image capturing module further includes a display panel and a band pass filter. The display panel is disposed between the cover plate and the light collimator. The band pass filter is disposed between the light collimator and the sensor.

To sum up, in the image capturing module provided by the exemplary embodiments of the invention, since the light leaking from the clad is absorbed by the light absorbing columns surrounding the fiber, the crosstalk problem is effectively improved. Therefore, the image capturing module features a favorable identifying capability.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
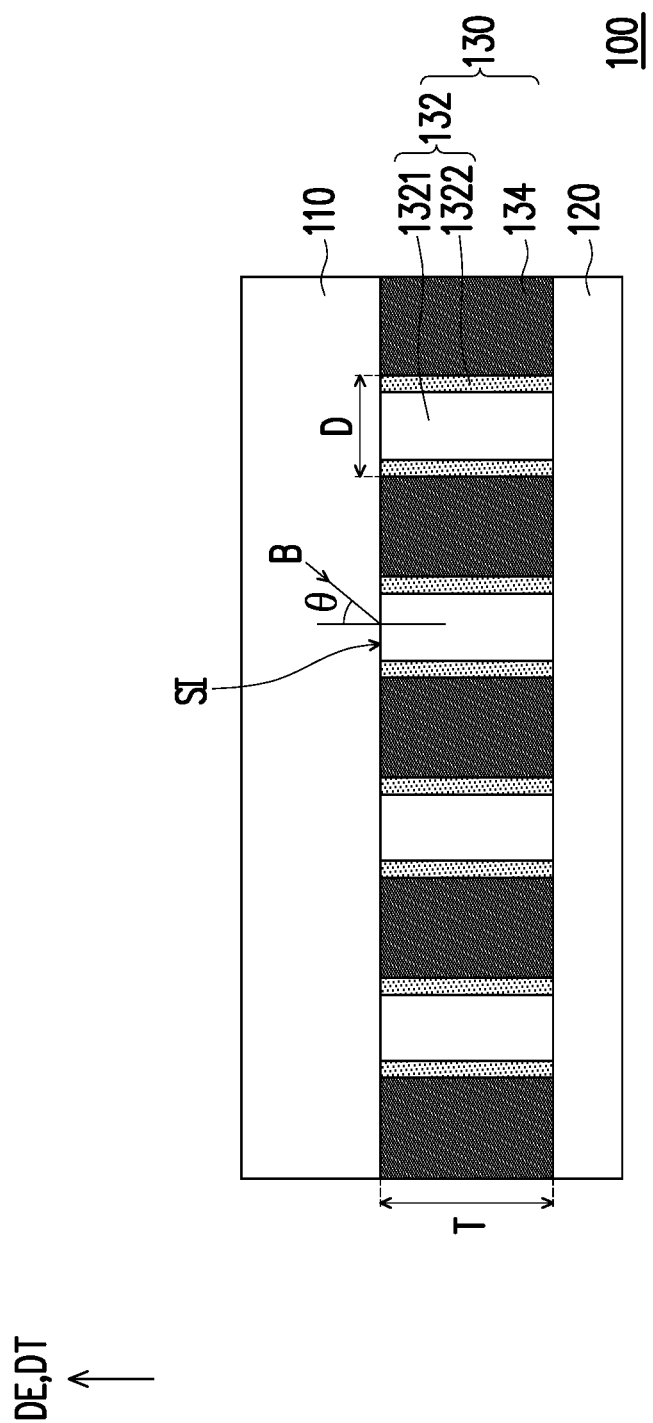
FIG. 1A is a schematic cross-sectional view of an image capturing module according to an exemplary embodiment of the invention.

It should be understood that the foregoing and other detailed descriptions, features, and effects are intended to be described more comprehensively by providing exemplary embodiments accompanied with drawings hereinafter.

In the drawings, common characteristics of the methods, structures and/or materials used in specific exemplary embodiments are shown. However, the drawings are not limited to the structures or features of the following exemplary embodiments and the drawings should not be interpreted to define or limit the scopes or the properties of the descriptions in the exemplary embodiments. For instance, the relative thickness and location of each film layer, region, and/or structure may be reduced or enlarged for clarity.

In the following exemplary embodiments, wording used to indicate directions, such as "up," "down," "front," "back," "left," and "right," merely refers to directions in the accompanying drawings. Therefore, the directional wording is used to illustrate rather than limit the invention. Moreover, the same or similar reference numerals represent the same or similar elements in any of the following exemplary embodiments, and repeated description thereof is thus omitted.

An image capturing module listed in the following exemplary embodiments is adapted to capture a biometric feature of an object. The object may be a finger, a palm, a wrist, or eyeballs. Correspondingly, the biometric feature may be fingerprints, palm prints, veins, pupils, or irises, but are not limited thereto.

Figure 1B:
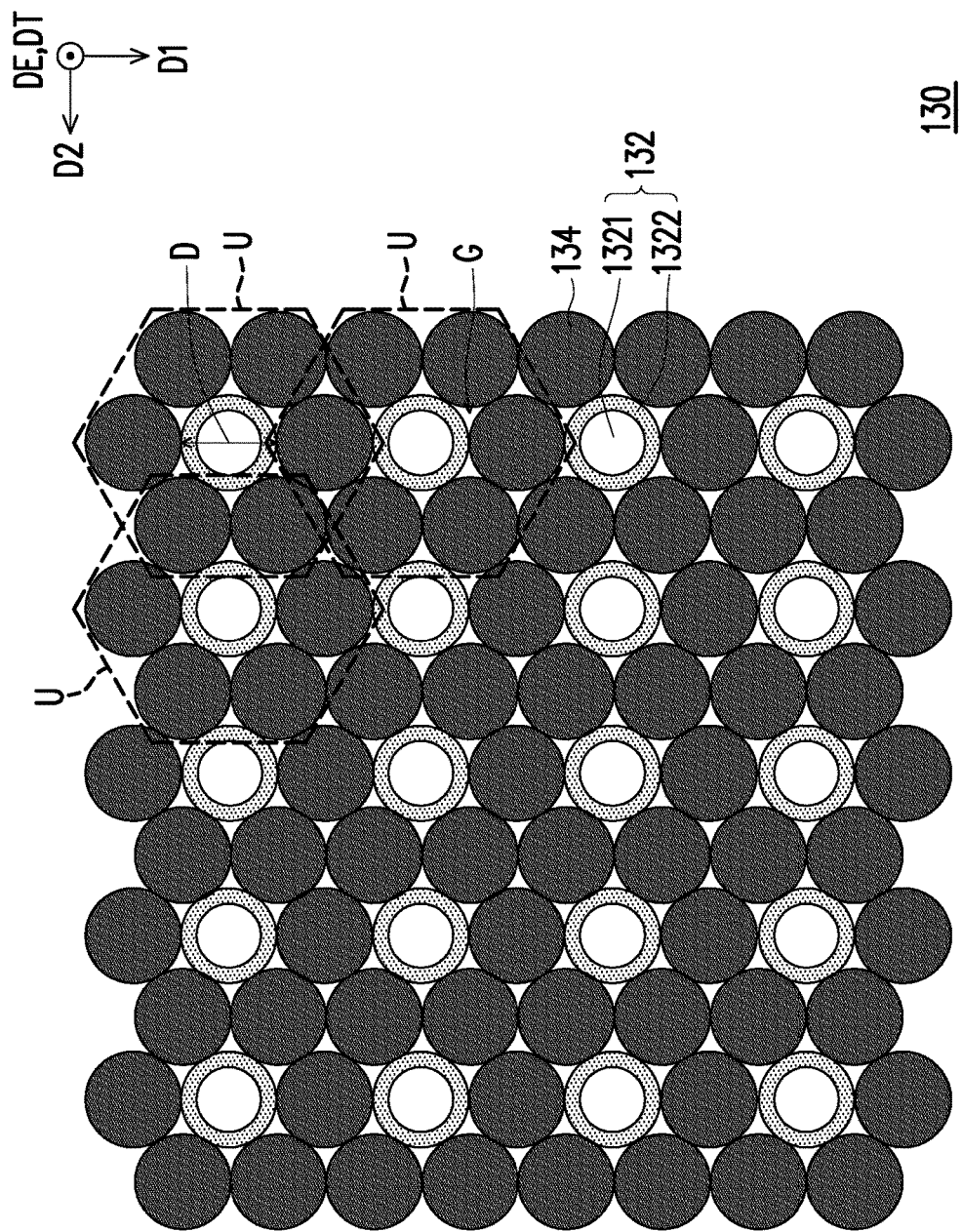
FIG. 1B is a schematic local top view of a light collimator in FIG. 1A.

FIG. 1A is a schematic cross-sectional view of an image capturing module according to an exemplary embodiment of the invention. FIG. 1B is a schematic local top view of a light collimator in FIG. 1A. With reference to FIG. 1A and FIG. 1B, an image capturing module 100 includes a cover plate 110, a sensor 120, and a light collimator 130.

The cover plate 110 is adapted to protect devices located below the cover plate 110 (e.g., the sensor 120 and the light collimator 130). For instance, the cover plate 110 may be a glass cover plate or a plastic cover plate, but is not limited thereto.

The sensor 120 is adapted to receive a light beam (i.e., a light beam carrying biometric feature information, not shown) reflected by the object (not shown). For instance, the sensor 120 may include a charge coupled device (CCD), a complementary metal-oxide semiconductor (CMOS), or optical sensing devices of other suitable types.

The light collimator 130 is disposed between the cover plate 110 and the sensor 120. Further, the light collimator 130 may be fixed together with an adjacent device (e.g., the cover plate 110 and the sensor 120) through an adhesive layer (not shown) or a fixing mechanism (not shown). The adhesive layer may be an optical clear adhesive (OCA), but is not limited thereto.

The light collimator 130 includes a plurality of light collimating units U (only three light collimating units U adjacent to one another are schematically shown in FIG. 1B). Each of the light collimating units U includes at least one fiber 132 and a plurality of light absorbing columns 134. The light absorbing columns 134 are disposed parallel to the at least one fiber 132 and surround the at least one fiber 132.

In this exemplary embodiment, each of the light collimating units U includes one fiber 132 and six light absorbing columns 134, as shown in FIG. 1B. The six light absorbing columns 134 are disposed around a circumference of the fiber 132, and adjacent two light collimating units U share at least one light absorbing column 134. The light collimating units U are arranged in a first direction D1 and in a second direction D2, respectively. The first direction D1 is perpendicular to the second direction D2. Further, the first direction D1 and the second direction D2 are perpendicular to a thickness direction DT of the cover plate 110. Two light collimating units U adjacent to each other in the first direction D1 share one light absorbing column 134, and two light collimating units U adjacent to each other in the second direction D2 share two light absorbing columns 134. In addition, in each of the light collimating units U, extending directions (e.g., a direction DE) of the fiber 132 and the six light absorbing columns 134 are perpendicular to the cover plate 110. In other words, the fiber 132 and the six light absorbing columns 134 extend in the thickness direction DT of the cover plate 110. Nevertheless, individual numbers of the fiber 132 and the light absorbing columns 134 in each of the light collimating units U, the number of light absorbing columns 134 shared by adjacent two light collimating units U, arrangement of the light collimating units U, and the extending directions of the fiber 132 and the light absorbing columns 134 may be changed according to needs and are not limited to the above.

Specifically, the fiber 132 is adapted to transmit the light beam reflected by the object to the sensor 120. The fiber 132 includes a core 1321 and a clad 1322 encapsulating the core 1321. A refractive index of the core 1321 is $n_1$, a refractive index of the clad 1322 is $n_2$, and $n_1 > n_2$ to satisfy the condition of total internal reflection (TIR). A numerical aperture of the fiber 132 is NA, and $NA = \sqrt{n_1^2 - n_2^2}$. A maximum incident angle of a light beam B incident into the light collimator 130 at a light incident surface SI of the fiber 132 (i.e., a maximum angle included between the light beam B and a normal direction of the light incident surface SI) is positively correlated with the numerical aperture of the fiber 132. That is, the smaller the numerical aperture of the fiber 132, the smaller the maximum incident angle of the fiber 132. An incident angle $\theta$ of the light beam B at the light incident surface SI is required to be less than the maximum incident angle, so that the light beam can be transmitted to the sensor 120 through total internal reflection after entering into the fiber 132. In other words, the smaller the numerical aperture of the fiber 132, the light beam transmitted to the sensor 120 can be collimated more effectively, so as to effectively improve the crosstalk problem. In this invention, $NA \leq 0.7$.

The light absorbing columns 134 are adapted to absorb stray light, such that, the stray light is prevented from being received by the sensor 120 to cause crosstalk. Specifically, if the incident angle $\theta$ of the light beam at the light incident surface SI is greater than the maximum incident angle, the light beam may be refracted on an interface between the core 1321 and the clad 1322 after entering the fiber 132, so that the light beam may easily leak out from the core 1321, and light leakage is thus generated. If no light absorbing column 134 is disposed, the leaking light may be transmitted to the sensor 120 through the adjacent fiber and thereby causes crosstalk. Nevertheless, when the fiber 132 is surrounded by the light absorbing columns 134, the light beam leaking from the core 1321 is absorbed by the light absorbing columns 134 and thus is not transmitted to the sensor 120. Therefore, the crosstalk problem may be effectively improved when the light absorbing columns 134 are disposed. As shown in FIG. 1B, each of the light absorbing columns 134 can be a solid light absorbing column body, but is not limited thereto.

In each of the light collimating units U in the light collimator 130, gaps G exist between the fiber 132 and the light absorbing columns 134. The gaps G may be filled with air. Alternatively, the gaps G may be filled with a light transmissive medium or a non-light transmissive medium (e.g., a light absorbing medium). For instance, the gaps G may be filled with a transparent or a colored (e.g., dark-colored) adhesive. If the gaps G are filled with a light transmissive medium (not shown), a refractive index of the light transmissive medium is preferably to be greater than a refractive index of the clad 1322. In this way, since total internal reflection does not occur at an interface between the light-transmitting medium and the shell 1322, the large-angle light leakage is not returned to the optical fiber 132 by total internal reflection. In contrast, after leaking out from the clad 1322 and entering the gaps G, the large-angle light leakage may then be absorbed by the light absorbing columns 134.

The capability of the light collimator 130 to improve crosstalk is related to a thickness T of the light collimator 130 and a distance D between two light absorbing columns 134 farthest from each other among the light absorbing columns 134 in each of the light collimating units U. Specifically, if the distance D is unchanged, the thicker the light collimator 130, light beams incident at larger angles are more likely to be filtered out; nevertheless, the overall module becomes thicker. From another perspective, if the thickness T of the light collimator 130 is unchanged, the smaller the distance D, the light beams incident at larger angles are more likely to be filtered out; nevertheless, the amount of light incident into the sensor 120 decreases. In the invention, since $D \leq T \times \tan[\sin^{-1}(NA)]$, the crosstalk problem is improved while the thickness of the module and the amount of light incident into the sensor 120 are also taken into account.

FIG. 2 to FIG. 5 are schematic local top views of other types of light collimators of the invention. According to different needs, the light collimator 130 of the image capturing module 100 in FIG. 1A may be replaced with light collimators 130A, 130B, 130C, and 130D shown in FIG. 2 to FIG. 5.

With reference to FIG. 1B to FIG. 5, differences among the light collimators 130, 130A, 130B, 130C, and 130D include constitutions of the light collimating units, arrangements of the light collimating units, the numbers of the light absorbing columns shared by adjacent two light collimating units, and the distance between two light absorbing columns farthest from each other among the light absorbing columns in each of the light collimating units.

Figure 2:
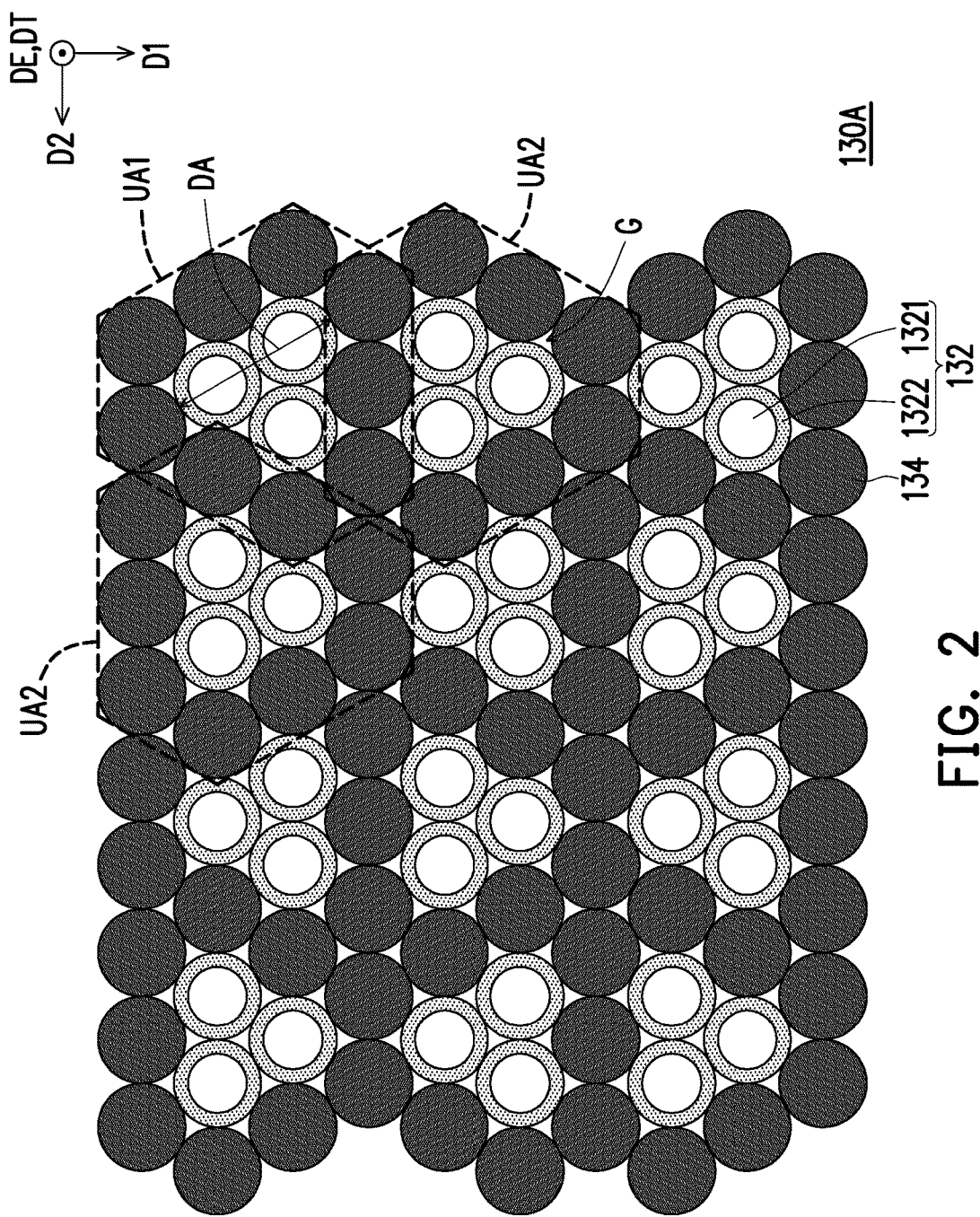
FIG. 2 to FIG. 5 are schematic local top views of other types of light collimators of the invention.

Specifically, in FIG. 2, the light collimator 130A includes a plurality of light collimating units UA1 and a plurality of light collimating units UA2. Each of the light collimating units (including the light collimating units UA1 and the light collimating units UA2) is constituted by three fibers 132 and nine light absorbing columns 134. The light collimating units UA1 and the light collimating units UA2 are arranged in an alternating arrangement manner in the first direction D1 and the second direction D2, respectively. Further, the light collimating units UA1 and the light collimating units UA2 are mirror symmetric relative to the second direction D2 as the symmetric axis. The light collimating unit UA1 and the light collimating unit UA2 adjacent to each other in the first direction D1 share three light absorbing columns 134, and the light collimating unit UA1 and the light collimating unit UA2 adjacent to each other in the second direction D2 share two light absorbing columns 134. In addition, in each of the light collimating units (including the light collimating units UA1 and the light collimating units UA2), a distance DA between two light absorbing columns 134 farthest from each other among the light absorbing columns 134 is two times greater than the distance D in FIG. 1B.

Figure 3:
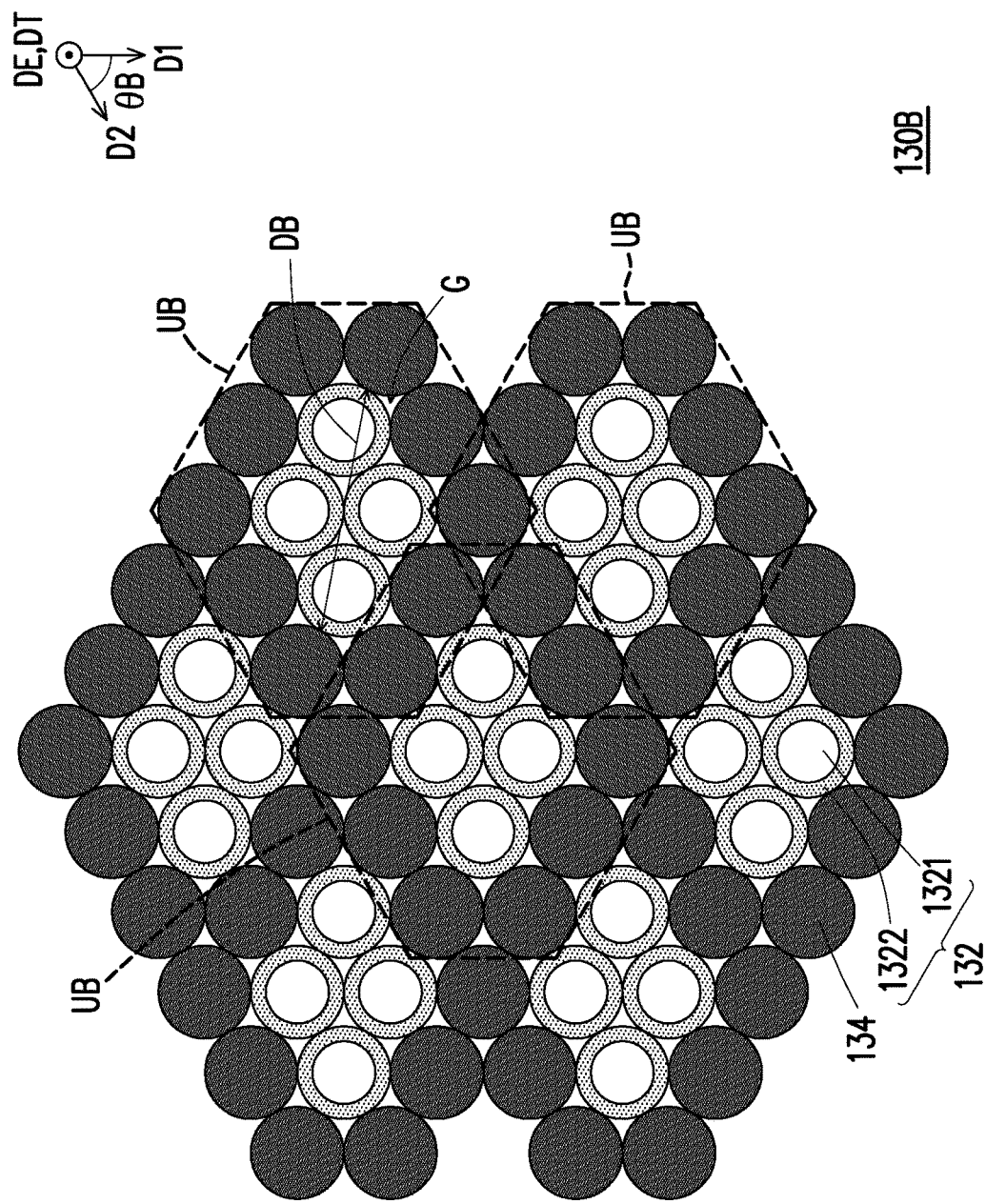

In FIG. 3, the light collimator 130B includes a plurality of light collimating units UB. Each of the light collimating units UB is constituted by four fibers 132 and ten light absorbing columns 134. The light collimating units UB are arranged in the first direction D1 and the second direction D2, respectively. Herein, an included angle θB between the first direction D1 and the second direction D2 is greater than 0 degrees and less than 90 degrees. Two light collimating units UB adjacent to each other in the first direction D1 share one light absorbing column 134, and two light collimating units UB adjacent to each other in the second direction D2 share two light absorbing columns 134. In addition, in each of the light collimating units UB, a distance DB between two light absorbing columns 134 farthest from each other among the light absorbing columns 134 is two times to three times greater than the distance D in FIG. 1B.

Figure 4:
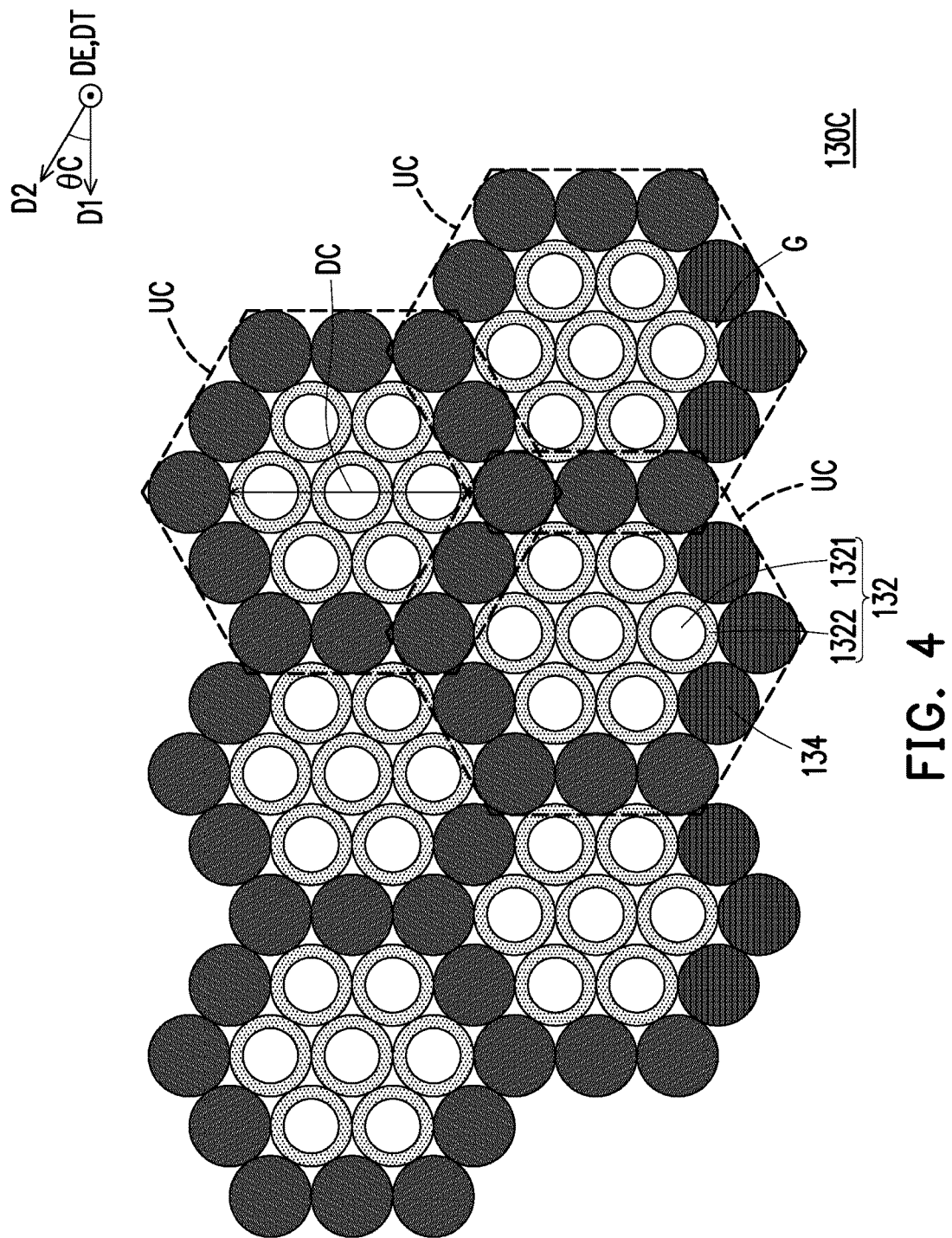

In FIG. 4, the light collimator 130C includes a plurality of light collimating units UC. Each of the light collimating units UC is constituted by seven fibers 132 and twelve light absorbing columns 134. The light collimating units UC are arranged in the first direction D1 and the second direction D2, respectively. Herein, an included angle θC between the first direction D1 and the second direction D2 is greater than 0 degrees and less than 90 degrees. Two light collimating units UC adjacent to each other in the first direction D1 share three light absorbing columns 134, and two light collimating units UC adjacent to each other in the second direction D2 share three light absorbing columns 134. In addition, in each of the light collimating units UC, a distance DC between two light absorbing columns 134 farthest from each other among the light absorbing columns 134 is three times greater than the distance D in FIG. 1B.

Figure 5:
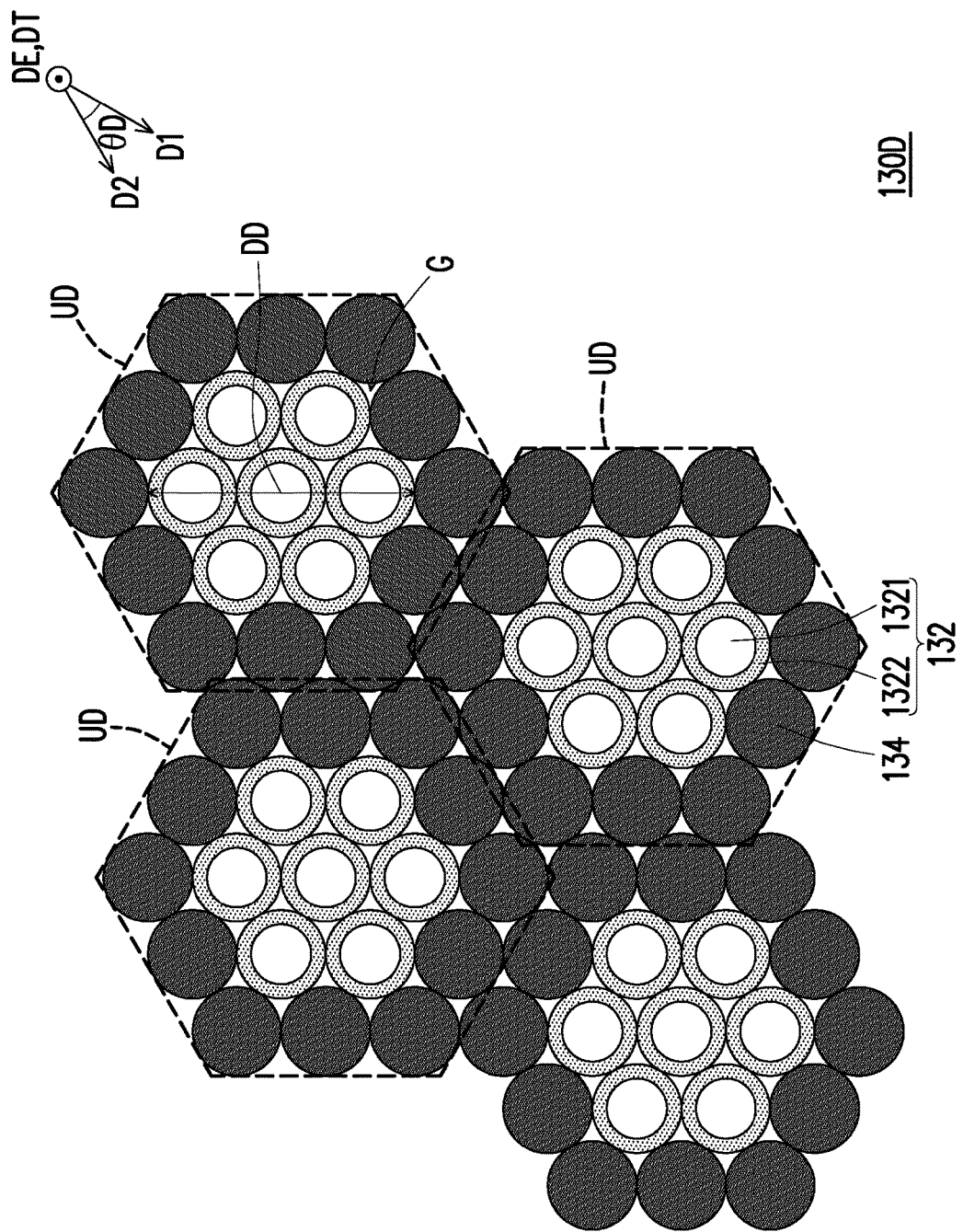

In FIG. 5, the light collimator 130D includes a plurality of light collimating units UD. Each of the light collimating units UD is constituted by seven fibers 132 and twelve light absorbing columns 134. The light collimating units UD are arranged in the first direction D1 and the second direction D2, respectively. Herein, an included angle θD between the first direction D1 and the second direction D2 is greater than 0 degrees and less than 90 degrees. Two light collimating units UD adjacent to each other in the first direction D1 do not share any light absorbing column 134, and two light collimating units UD adjacent to each other in the second direction D2 do not share any light absorbing column 134. In addition, in each of the light collimating units UD, a distance DD between two light absorbing columns 134 farthest from each other among the light absorbing columns 134 is three times greater than the distance D in FIG. 1B. Since any adjacent two light collimating units UD do not share any light collimating unit 134, the light collimator 130D in FIG. 5 is easier to manufacture compared to the light collimator 130C in FIG. 4.

Arrangement of the fibers and the light absorbing columns of FIG. 1B to FIG. 5 may be adopted by any exemplary embodiment below, which will not be described again hereinafter.

FIG. 6 to FIG. 11 are schematic cross-sectional views of image capturing modules according to other exemplary embodiments of the invention.

Figure 6:
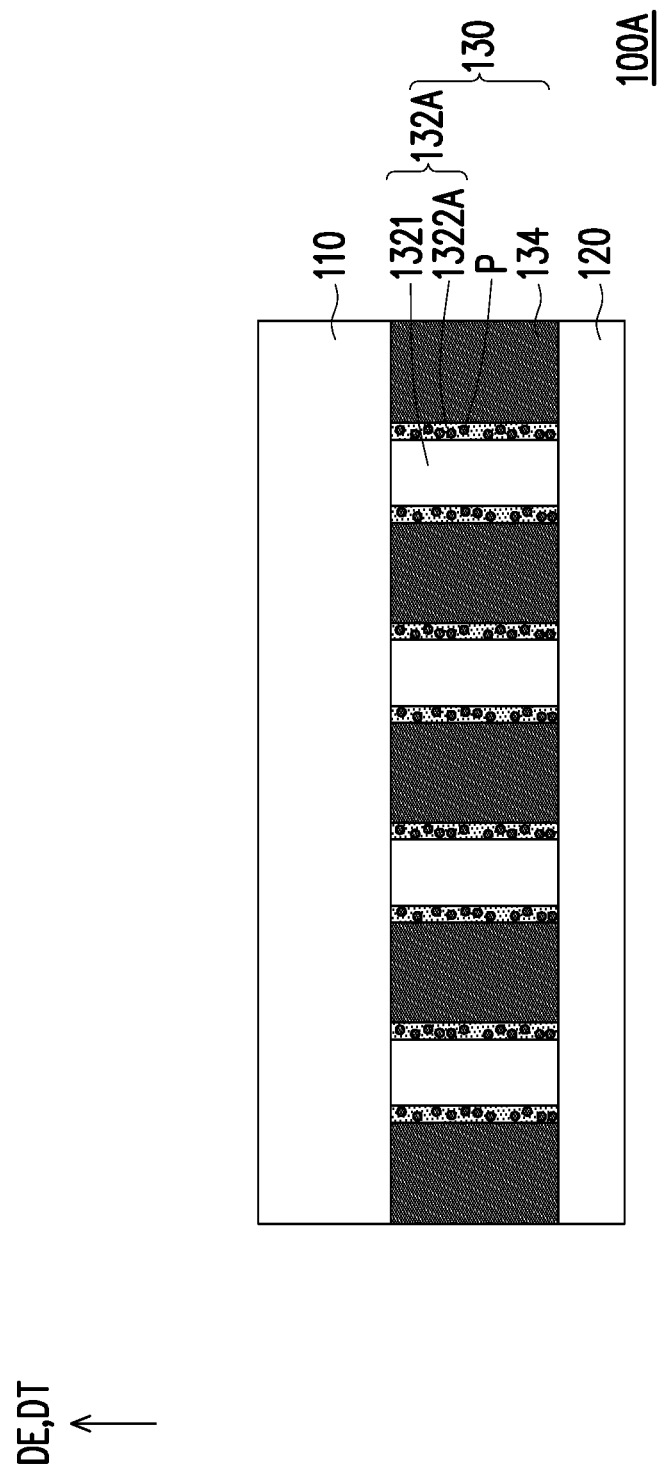
FIG. 6 to FIG. 11 are schematic cross-sectional views of image capturing modules according to other exemplary embodiments of the invention.

With reference to FIG. 6, a difference between an image capturing module 100A and the image capturing module 100 of FIG. 1A is described as follows. In the image capturing module 100A, a clad 1322A of a fiber 132A further includes a plurality of light absorption particles P to absorb the stray light entering the clad 1322A.

Figure 7:
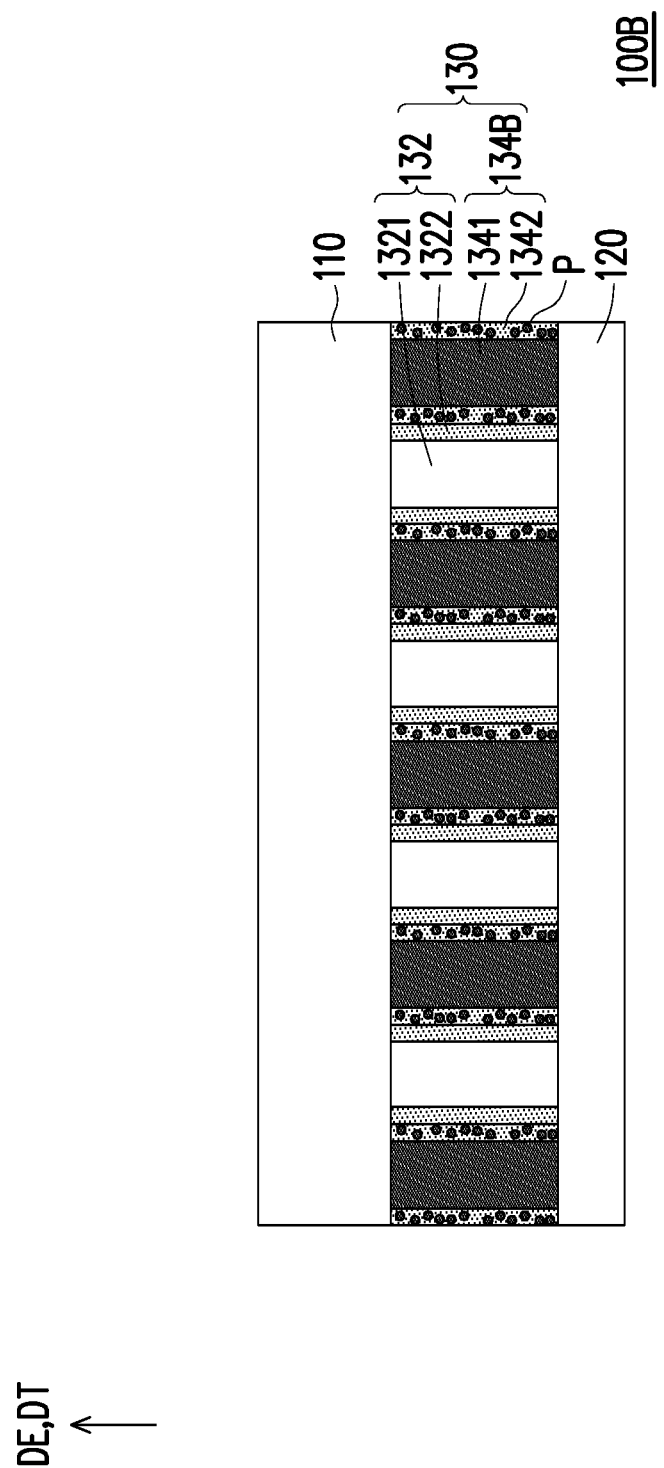

With reference to FIG. 7, a difference between an image capturing module 100B and the image capturing module 100 of FIG. 1A is described as follows. In the image capturing module 100B, each of light absorbing columns 134B includes a light absorbing core 1341 and a clad 1342. Further, the light absorbing core 1341 is a solid light absorbing column body. The clad 1342 surrounds the light absorbing core 1341, and the clad 1342 includes a plurality of light absorption particles P.

In an exemplary embodiment, the fiber 132 in the image capturing module 100B may be replaced with the fiber 132A of FIG. 6. That is, the clad 1322 in FIG. 7 may further include the light absorption particles P as well.

Figure 8:
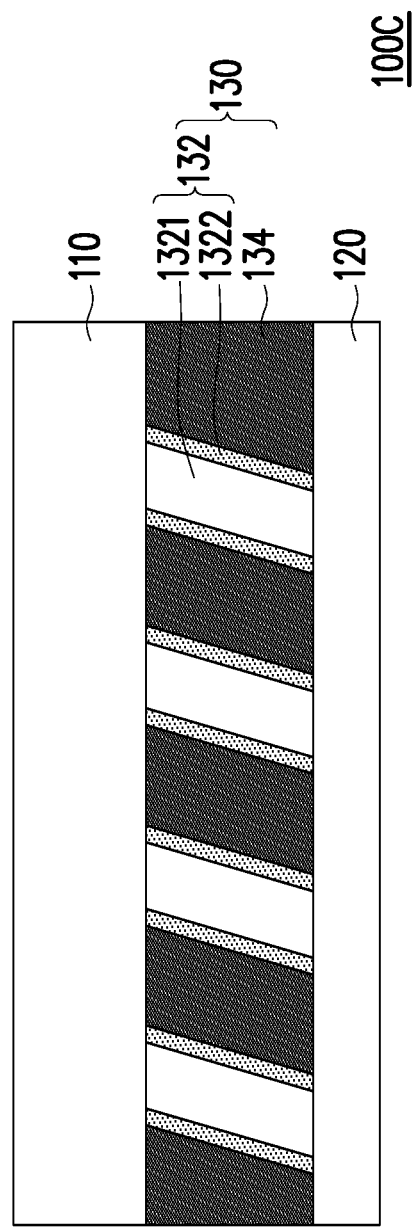
Figure 8:
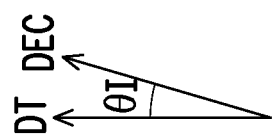

With reference to FIG. 8, a difference between an image capturing module 100C and the image capturing module 100 of FIG. 1A is described as follows. In the image capturing module 100C, extending directions (e.g., a direction DEC) of the fiber 132 and the light absorbing columns 134 are inclined with respect to the cover plate 110. In other words, an included angle θI between the extending direction (e.g., the direction DEC) and the thickness direction DT of the cover plate 110 is between 0 degrees and 90 degrees.

According to different needs, the fiber 132 in the image capturing module 100C may be replaced with the fiber 132A in FIG. 6, and/or the light absorbing columns 134 in the image capturing module 100C may be replaced with the light absorbing columns 134B in FIG. 7.

Figure 9:
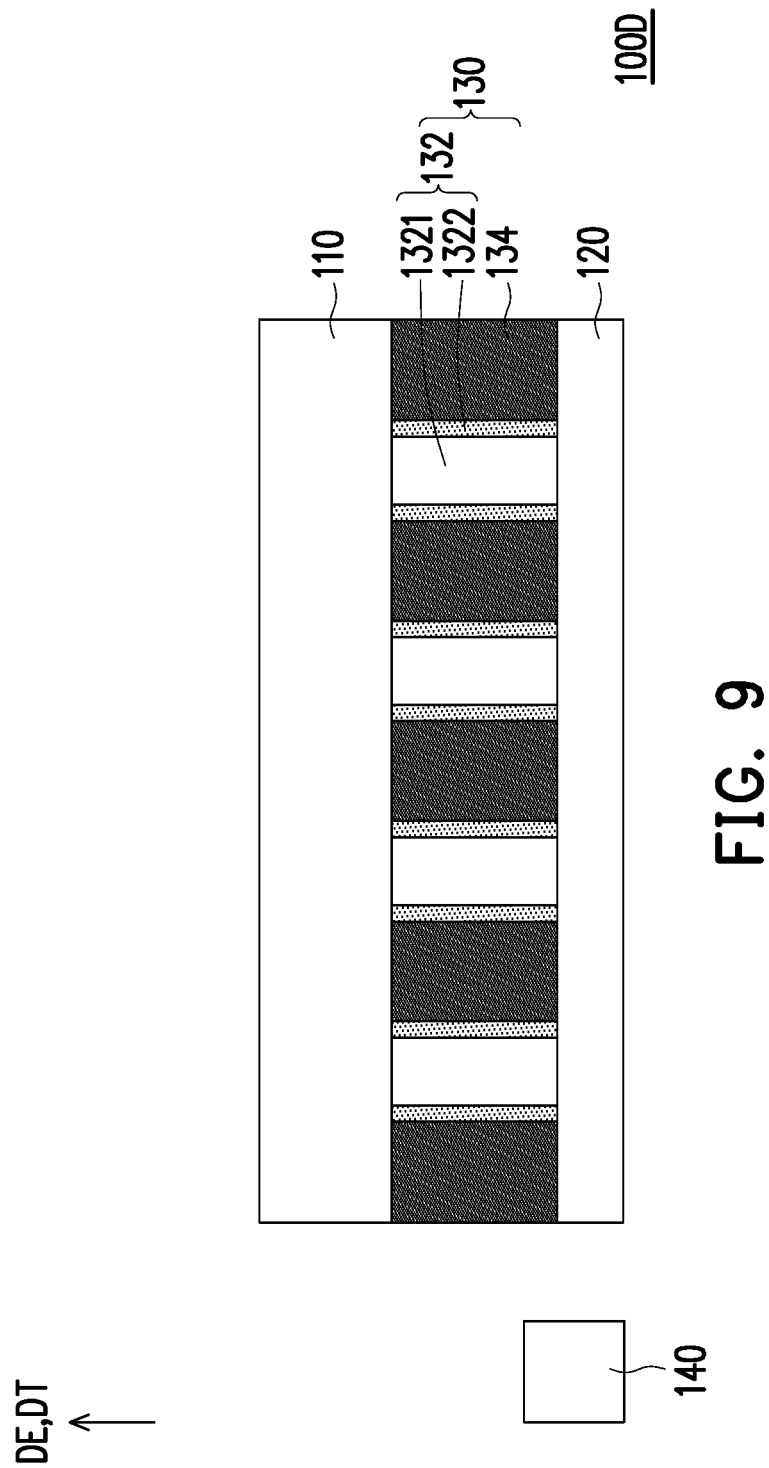

With reference to FIG. 9, a difference between an image capturing module 100D and the image capturing module 100 of FIG. 1A is that the image capturing module 100D further includes a light source 140. The light source 140 is disposed next to the sensor 120. A light beam emitted by the light source 140 may be used for the biometric feature identification. For instance, the light source 140 may include a non-visible light source such as an infrared light source, but is not limited thereto.

According to different needs, the fiber 132 and the light absorbing columns 134 in the image capturing module 100D may be inclined with respect to the cover plate 110 (see FIG. 8); the fiber 132 in the image capturing module 100D may be replaced with the fiber 132A in FIG. 6; and/or the light absorbing columns 134 in the image capturing module 100D may be replaced with the light absorbing columns 134B in FIG. 7.

Figure 10:
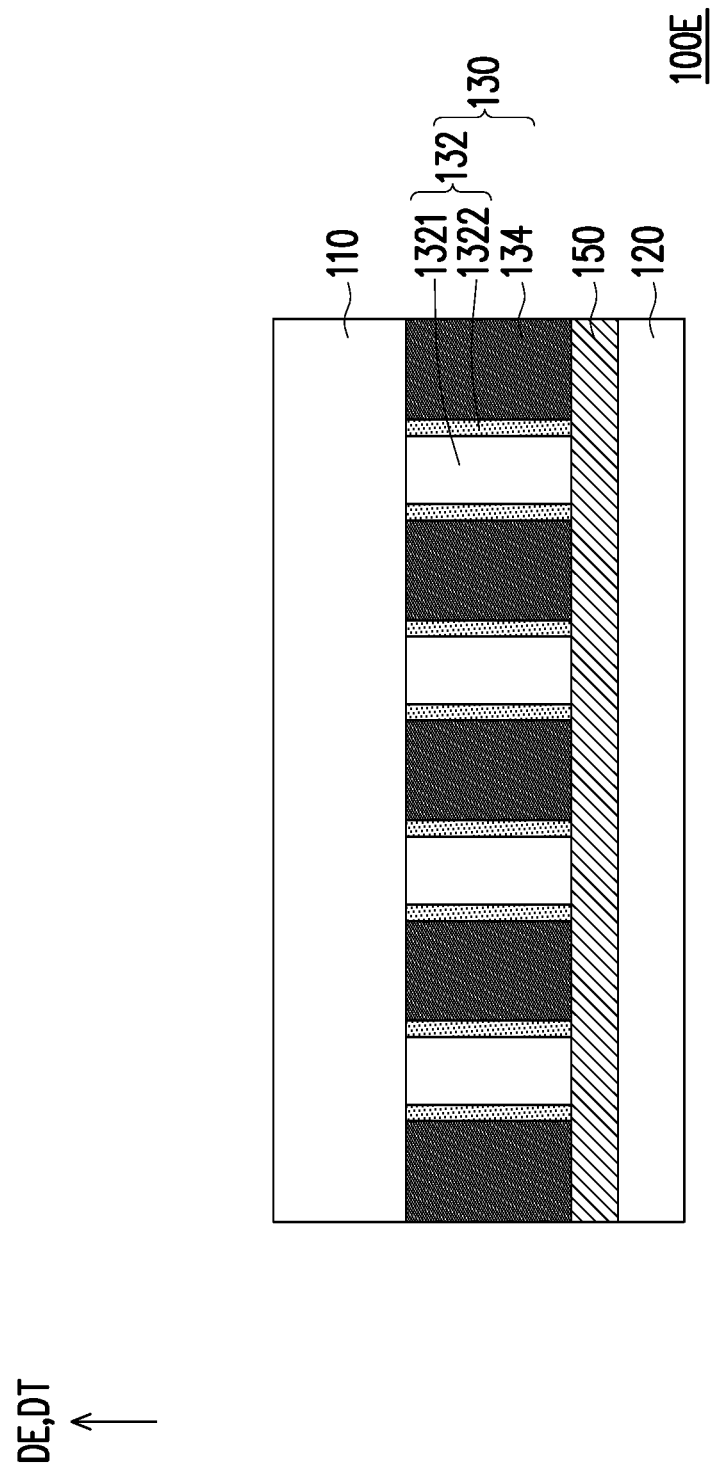

With reference to FIG. 10, a difference between an image capturing module 100E and the image capturing module 100 of FIG. 1A is that the image capturing module 100E further includes a band pass filter 150. The band pass filter 150 is disposed between the light collimator 130 and the sensor 120. The band pass filter 150 is adapted to filter out a light beam (a wave band which is not used for the biometric feature identification) in ambient light beams that is not intended to be received by the sensor 120.

According to different needs, the image capturing module 100E may further include the light source 140 shown in FIG. 9 while at least a portion of an emission spectrum of the light source 140 overlaps a transmission spectrum of the band pass filter 150; the fiber 132 and the light absorbing columns 134 in the image capturing module 100E may be inclined with respect to the cover plate 110 (see FIG. 8); the fiber 132 in the image capturing module 100E may be replaced with the fiber 132A in FIG. 6; and/or the light absorbing columns 134 in the image capturing module 100E may be replaced with the light absorbing columns 134B in FIG. 7.

Figure 11:
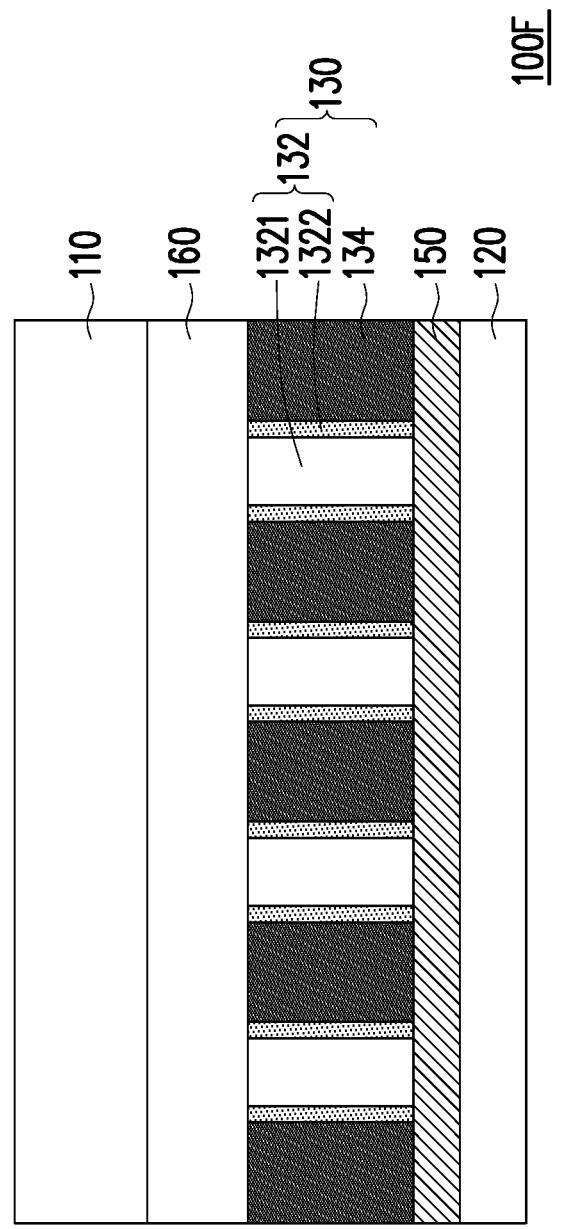

With reference to FIG. 11, a difference between an image capturing module 100F and the image capturing module 100E of FIG. 10 is that the image capturing module 100F further includes a display panel 160. The display panel 160 is disposed between the cover plate 110 and the light collimator 130. The display panel 160 is adapted to provide a display image. In this exemplary embodiment, a portion of a light beam provided by the display panel 160 may be used for the biometric feature identification. Under such a structure, at least a portion of an emission spectrum of the display panel 160 overlaps the transmission spectrum of the band pass filter 150.

According to different needs, the image capturing module 100F may further include the light source 140 shown in FIG. 9, wherein the display panel 160 may simply be configured to provide the display image, the light source 140 provides the light beam for the biometric feature identification, and at least a portion of an emission spectrum of the light source 140 overlaps the transmission spectrum of the band pass filter 150; the fiber 132 and the light absorbing columns 134 in the image capturing module 100F may be inclined with respect to the cover plate 110 (see FIG. 8); the fiber 132 in the image capturing module 100F may be replaced with the fiber 132A in FIG. 6; and/or the light absorbing columns 134 in the image capturing module 100F may be replaced with the light absorbing columns 134B in FIG. 7.

In view of the foregoing, in the image capturing module provided by the exemplary embodiments of the invention, since the light leaking from the clad is absorbed by the light absorbing columns surrounding the fiber, the crosstalk problem is effectively improved. Therefore, the image capturing module features a favorable identifying capability. In an exemplary embodiment, the devices (e.g., the fiber or the light absorbing columns) in the light collimator may further include light absorption particles to absorb the stray light. In addition, the image capturing module may further include other devices (e.g., the light source, the display panel, the band pass filter, or the fixing devices and the like) according to needs.

It will be apparent to those skilled in the art that various modifications and variations can be made to the disclosed exemplary embodiments without departing from the scope or spirit of the disclosure. In view of the foregoing, it is intended that the disclosure covers modifications and variations provided that they fall within the scope of the following claims and their equivalents.

What is claimed is:

1. An image capturing module, comprising:
   a cover plate;
   a sensor; and
   a light collimator, disposed between the cover plate and the sensor, the light collimator comprising a plurality of light collimating units, each of the light collimating units comprising at least one fiber and a plurality of light absorbing columns, wherein the light absorbing columns are disposed parallel to the at least one fiber and surrounding the at least one fiber, a thickness of the light collimator is T, a distance between two light absorbing columns farthest from each other among the light absorbing columns in each of the light collimating units is D, a numerical aperture of the at least one fiber is NA, $NA \leq 0.7$, and $D \leq T \times \tan[\sin^{-1}(NA)]$.

2. The image capturing module as claimed in claim 1, wherein any two adjacent light collimating units share at least one light absorbing column.

3. The image capturing module as claimed in claim 1, wherein any two adjacent light collimating units do not share any light absorbing column.

4. The image capturing module as claimed in claim 1, wherein a clad of the at least one fiber comprises a plurality of light absorption particles.

5. The image capturing module as claimed in claim 1, wherein each of the light absorbing columns is a solid light absorbing column body.

6. The image capturing module as claimed in claim 1, wherein each of the light absorbing columns comprises a light absorbing core and a clad encapsulating the light absorbing core, and the clad comprises a plurality of light absorption particles.

7. The image capturing module as claimed in claim 1, wherein extending directions of the at least one fiber and the light absorbing columns are perpendicular to or inclined with respect to the cover plate.

8. The image capturing module as claimed in claim 1, further comprising:
a light source, disposed next to the sensor.

9. The image capturing module as claimed in claim 1, further comprising:
a band pass filter, disposed between the light collimator and the sensor.

10. The image capturing module as claimed in claim 1, further comprising:
a display panel, disposed between the cover plate and the light collimator; and
a band pass filter, disposed between the light collimator and the sensor.

11. The image capturing module as claimed in claim 1, wherein each of the light collimating units comprises a plurality of the fibers surrounded by the light absorbing columns, and the distance between two light absorbing columns farthest from each other among the light absorbing columns in each of the light collimating units is larger than a diameter of each of the fibers.

12. The image capturing module as claimed in claim 1, wherein the light absorbing columns are not located between any two fibers located in the same light collimating unit.

13. An image capturing module, comprising:
a sensor; and
a light collimator, disposed above the sensor, the light collimator comprising a plurality of light collimating units, each of the light collimating units comprising at least one fiber and a plurality of light absorbing columns, wherein the light absorbing columns are disposed parallel to the at least one fiber and surrounding the at least one fiber, a thickness of the light collimator is T, a distance between two light absorbing columns farthest from each other among the light absorbing columns in each of the light collimating units is D, a numerical aperture of the at least one fiber is NA, $NA \leq 0.7$, and $D \leq T \times \tan[\sin^{-1}(NA)]$, wherein any two adjacent light collimating units share at least one light absorbing column.

14. The image capturing module as claimed in claim 13, wherein a clad of the at least one fiber comprises a plurality of light absorption particles.

15. The image capturing module as claimed in claim 13, wherein each of the light absorbing columns is a solid light absorbing column body.

16. The image capturing module as claimed in claim 13, wherein each of the light absorbing columns comprises a light absorbing core and a clad encapsulating the light absorbing core, and the clad comprises a plurality of light absorption particles.

17. The image capturing module as claimed in claim 13, wherein extending directions of the at least one fiber and the light absorbing columns are perpendicular to or inclined with respect to the sensor.

18. The image capturing module as claimed in claim 13, further comprising:
a band pass filter, disposed between the light collimator and the sensor.

19. The image capturing module as claimed in claim 13, wherein each of the light collimating units comprises a plurality of the fibers surrounded by the light absorbing columns, and the distance between two light absorbing columns farthest from each other among the light absorbing columns in each of the light collimating units is larger than a diameter of each of the fibers.

20. The image capturing module as claimed in claim 19, wherein the light absorbing columns are not located between any two fibers located in the same light collimating unit.

* * * * *